(12) United States Patent
Hochman (10) Patent No.: US 12,154,078 B2
(45) Date of Patent: Nov. 26, 2024

(54) SYSTEM AND METHOD OF DOCUMENTING AIRCRAFT PARTS CONDITION, REPAIR, AND OVERHAUL

(71) Applicant: Gary Philip Hochman, Delray Beach, FL (US)

(72) Inventor: Gary Philip Hochman, Delray Beach, FL (US)

(*) Notice: Subject to any disclaimer, the term of this patent is extended or adjusted under 35 U.S.C. 154(b) by 149 days.

(21) Appl. No.: 17/811,667

(22) Filed: Jul. 11, 2022

(65) Prior Publication Data

US 2022/0343292 A1 Oct. 27, 2022

Related U.S. Application Data

(63) Continuation-in-part of application No. 16/805,014, filed on Feb. 28, 2020, now Pat. No. 11,386,402.

(60) Provisional application No. 62/812,626, filed on Mar. 1, 2019.

(51) Int. Cl.
*G06Q 10/20* (2023.01)
*B64F 5/40* (2017.01)
*B64F 5/60* (2017.01)

(52) U.S. Cl.
CPC .............. *G06Q 10/20* (2013.01); *B64F 5/40* (2017.01); *B64F 5/60* (2017.01); *G06Q 2220/00* (2013.01)

(58) Field of Classification Search
CPC ...... G06Q 10/20; G06Q 2220/00; B64F 5/40; B64F 5/60
See application file for complete search history.

(56) References Cited

U.S. PATENT DOCUMENTS

| | | | |
|---|---|---|---|
| 2002/0169746 A1* | 11/2002 | Cowman ................. | G06F 16/93 |
| 2014/0341528 A1* | 11/2014 | Mahate ................. | G06V 20/40 |
| | | | 386/224 |
| 2022/0274703 A1* | 9/2022 | Di Cosola .............. | G06V 20/17 |

* cited by examiner

*Primary Examiner* — A. Hunter Wilder
(74) *Attorney, Agent, or Firm* — Dunlap Bennett & Ludwig PLLC (57) ABSTRACT

A system and method of documenting condition, repair, and overhaul of aircraft parts. The system and method include searching a database for an electronic file of an aircraft part; creating an electronic file of the aircraft part if the electronic file is not found on the database; generating a maintenance report data package that is linked to the electronic file; capturing, using a camera or a microphone, aircraft part data including a single or plurality of pictures, a video recording, and a voice recording; linking the aircraft part data to the maintenance report data package; and saving an updated version of the electronic file to the database.

1 Claim, 10 Drawing Sheets

PARTS HISTORY REPORT

600

| | |
|---|---|
| Vertical Market | Commercial |
| Part Number | 368556-01 |
| Alternate Part Number | 74859606 |
| CAGE | 3456 |
| Serial Number: | 76394856-11-01 |
| Description | Electronic Sensor |
| IATA Number: | 34 |
| OEM Aircraft compatability: | Boeing |
| Born On Date: | 11/1/1998 |
| OEM | Honeywell |
| Factory Location | Tempe AZ |
| Service Bulletin | None |
| Incident Reports | None |
| AD Reports | 2020-26-04 |
| Aircraft Model | B737-213 |
| Aircraft Installation | Tail Number |
| Tail Number | TY-34N2 |

COLOR KEY:
Red: indicative of negative data
Yellow: indicative of cautionary data
Blue: indicative of updated data
Orange: indicative of incident-related data

Ownership History

| Start Date | Date End | PO Number | Owner | Location | Descriptior | Condition | Status | BER Date |
|---|---|---|---|---|---|---|---|---|
| 10/15/2001 | 7/20/2008 | AA | AALA | In House | Sensor | SV | Complete | NA |
| 7/20/2008 | Current | United | UAL | In House | Sensor | OH | Complete | NA |

Service History

| Date | Repair Order # | Own/Exchange /Loan | Name | Cert. ID | Trans date | Descriptor | Condition | Status | | BER Date |
|---|---|---|---|---|---|---|---|---|---|---|
| 10/18/2001 | 532589-2114 | AA | | AALA | 10/17/2001 | Sensor | TAG | Complete | Honeywell OEM | NA |

SYSTEM AND METHOD OF DOCUMENTING AIRCRAFT PARTS CONDITION, REPAIR, AND OVERHAUL

CROSS-REFERENCE TO RELATED APPLICATION

This application claims the benefit of priority of U.S. provisional application No. 62/812,626, filed Mar. 1, 2019, and claims the benefit of priority of U.S. nonprovisional application Ser. No. 16/805,014, filed Feb. 28, 2020, as a continuation in part thereof, the contents of both are herein incorporated by reference.

BACKGROUND OF THE INVENTION

The present invention relates to aircraft parts, maintenance and, more particularly, to a system and method of documenting condition/repair/overhaul of aircraft parts.

When aircrafts are manufactured, parted out or a part or engine fails on a current flying aircraft, repairs or replacement will be needed. Currently, airlines, maintenance, repair, overall (MRO's), and owner operators may either buy a new part or repair the part. The government mandated documentation process today is a paper-based trace document that is filled out by the service technician. The documents contain the part number, part serial number, and the aircraft it was removed from. To date there is no standardized and automated digital photographic, video, or digital voice recording capabilities at the field, office, parts, or repair shop.

Depending on an aircraft's size, a plane can include millions of separable parts, each with their own condition or history. Maintenance companies frequently log records by hand. Those records are often shared in stacks of printed PDFs. Even when data are digitized, it is spread across and isolated with multiple parties and systems. Suppliers, vendors, and customers of the same manufacturer, who may also compete against one another, are reluctant to share information. And when there's no provenance or an invoice is missing, a part's airworthiness must be established through Investigation, testing, and recertification—all of which take time and money.

As can be seen, there is a need for a system and method of documenting condition/repair/overhaul of aircraft parts, as well as a methodology for capturing aircraft and engine parts in varying conditions such as 'new', 'used', 'refurbished', 'reconditioned', 'rebuilt', 'overhauled', etc. The system of the present invention captures and compiles the aircraft-part documentation in a searchable parts history report.

Blockchain's decentralized, immutable, and consensus-based nature makes it a perfect fit to help overcome the above-mentioned challenges. At the most basic level, every blockchain is a digital ledger of transactions that take place on a peer-to-peer network with the ability to control visibility—who has permission to see which data. Blockchain offers the capacity to create a digital birth certificate for every part that is updated each time the part moves through the supply chain or is installed on a plane. The part's status also gets updated every time the plane is serviced or inspected by a technician. That part's digital record could include the aircraft's tail number and configuration, the part's location in the plane, its manufacturer, the identity of each technician who has touched the part, and the location where the service was performed. These digital records can be aggregated to provide a real-time snapshot of each parts condition from cradle to grave, decades later. Blockchain can also be used to ensure that participants have access only to the information they're entitled to. blockchain could simultaneously improve participants visibility into their own businesses while safeguarding their data from competitors.

Integrating blockchain into the documentation and tracking methodologies of the present invention further enhances the value of the searchable parts history report disclosed herein.

An important feature of the methodology by design embodied in the present invention will be the ability to eliminate data files related to part numbered and serialized parts being attached to emails for ecommerce or other reason. When a data file currently is attached it is also archived in the email server data base and once delivered to the recipient also archived on in the email server of the other company or individual, wasting memory. The current environment is to use the stored silo libraries linked to the master database in the cloud and share the data files via a link for viewing or downloading upon request. The part history reports also can be shared or linked to any email. Again, the Part History have links in them to the master database eliminating the need to move files as attachments in email which also results in blockage from email virus protection programs and company firewalls and content license limits. This methodology will save companies billions of bytes a year in storage and file maintenance costs.

SUMMARY OF THE INVENTION

In one aspect of the present invention, a method of documenting condition, repair, or overhaul of aircraft parts using blockchain integration, the method comprising steps of: entering, using a computing system, at least one identification number for an aircraft part; searching, using the computing system, a blockchain database for an electronic file of the aircraft part using the at least one identification number; creating, using the computing system, the electronic file of the aircraft part if the electronic file is not found on the blockchain database, wherein the at least one identification number is linked to the electronic file; generating, using the computing system, a maintenance report data package, wherein the maintenance report data package is linked to the electronic file; capturing, using at least one of a camera and a microphone, aircraft part data comprising at least one of at least one picture, a video recording, and a voice recording; linking, using the computing system, the aircraft part data to the maintenance report data package; and saving, using the computing system, an updated version of the electronic file in a block form so as to be addable to the blockchain database, wherein the computing system renders a searchable part history report for each aircraft part.

In another aspect of the present invention, a method of documenting condition, repair, or overhaul of aircraft parts, the method comprising steps of: entering, using a computing system, at least one identification number for an aircraft part, wherein the at least one identification number comprises a part number, a serial number, a tag number, an airplane manufacturer's serial number, or a combination thereof; searching, using the computing system, a database for an electronic file of the aircraft part using the at least one identification number; creating, using the computing system, the electronic file of the aircraft part if the electronic file is not found on the database, wherein the at least one identification number is linked to the electronic file; receiving, by way of the computing system, a universal tracking number for the electronic file of the aircraft part; generating, using the computing system, the universal tracking number if the electronic file was not found, and linking the universal tracking number with the at least one identification number; generating, using the computing system, a maintenance report data package, wherein the maintenance report data package is linked to the electronic file; entering, in response to and using the computing system, personal identifying data of a user generating the maintenance report data package, and linking, using the computing system, the personal identifying data to the maintenance report data package; entering, in response to and using the computing system, status identifying data of the aircraft part, and linking, using the computing system, the status identifying data to the maintenance report data package; capturing, using at least one capture device, wherein the at least one capture device comprises at least one of a camera and a microphone, aircraft part data comprising at least one of at least one picture, a video recording, and a voice recording; creating a filing name for each aircraft part data, wherein the filing name comprises the personal identifying data, the status identifying data, the universal tracking number, and data associated with the capture device; wherein the status identifying data is selected from the group comprises a pre-removed status, a pre-shipped to vendor status, a vendor received status, a post repair status, a pre-shipped back status, an airline received status and a pre-placed back status; linking, using the computing system, the filing name to the maintenance report data package; and saving, using the computing system, an updated version of the electronic file to the database, whereby all data captured is placed in a pooled and networked database compiling current data files with historical datafile residing or located in one or more third-party servers.

These and other features, aspects and advantages of the present invention will become better understood with reference to the following drawings, description and claims.

BRIEF DESCRIPTION OF THE DRAWINGS

FIG. 6 is a schematic view of an exemplary embodiment of a resultant parts history report generated by the present invention. The broken lines indicate a value or representation that embodies a clickable link and thus a searchable document. The searchable documents of the part history report may represent software as a service functionality of the present invention, wherein users may become systemic authorized users through a payment/subscription service module. Systemic authorized users are enabled to access the underlying documents through the clickable link. Note, there typically would be a far greater number of clickable links than the two exemplary ones shown. In one embodiment, instead of broken lines, the clickable value or representation may be one of a plurality of colors. For example, and as indicated in the Color Key in FIG. 6: a red-colored clickable value/representation may indicate negative data; a yellow-colored clickable value/representation may indicate cautionary data, attention-needed, or needs verification; a blue-colored clickable value/representation may indicate recently updated data; an orange-colored clickable value/representation may indicate the data is associated with an incident (e.g., the part came off a plane that crashed, which the FAA may prohibit future use of such a report); and a green-colored clickable value/representation may indicate satisfactory data (relative to earlier identified search criteria). In this embodiment, a black value/representation indicates there is no link/document to retrieve for a systemic authorized user.

FIG. 8B is a continuation of the schematic chart of FIG. 8A. The exemplary workflow of FIGS. 8A and 8B represent a blockchain-driven transactional flow chart covering the many transactions in performing part condition documentation through an aircraft part's many lifecycles and exchanges. Each transaction creates an opportunity to record the transactions of the part via a Blockchain module 110 containing trace data and linkage to other blocks related to the part via a serial number-part number-universal ID number or other embedded identification and trace methodology. These blocks are recorder in ledgers following well document structures insuring industry standardization.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

The present invention includes a universal digital photo capture, digital video capture, and digital sound capture for aircraft parts condition, testing, repair, overhaul, tracking, and compliance using smartphones, tablets, personal digital assistant (PDA), portable computers, and any capture capable device.

The present invention enables digital photo, digital video, and digital voice recording to be related to the part being serviced using a universal tracking system and file cross referencing methodologies. The present invention prompts the technician to take one or several pictures, videos, and voice recordings in a pre-configured standardized method and in a selected order. Additionally, the present invention names the recorded files in relation to the part and its repair process from off of the wing to the repair shop to the warehouse to back on the wing. The digital photo, digital video, and digital voice recording files and records related to the parts are linked with a lifetime trace document database with is at as part of the Back To Birth (BTB) history of that part and made globally available and shared via local, networked, or cloud based systems.

The present invention provides solutions to problems in the aviation repair/overhaul and trading industry. The new method provides standardization for file naming and automates the process. The present invention further creates a new level of sharing and tracking capability previously not available. The present invention allows for the documentation of the condition of parts removed, shipped, received, and repaired. The present invention provides a BTB and full part life photo, video, and voice recording library. The present invention helps the Federal Aviation Administration (FAA) in the case of part failures and finding the handling and service problems and people associated with the part in a globally available database.

Figure 1:
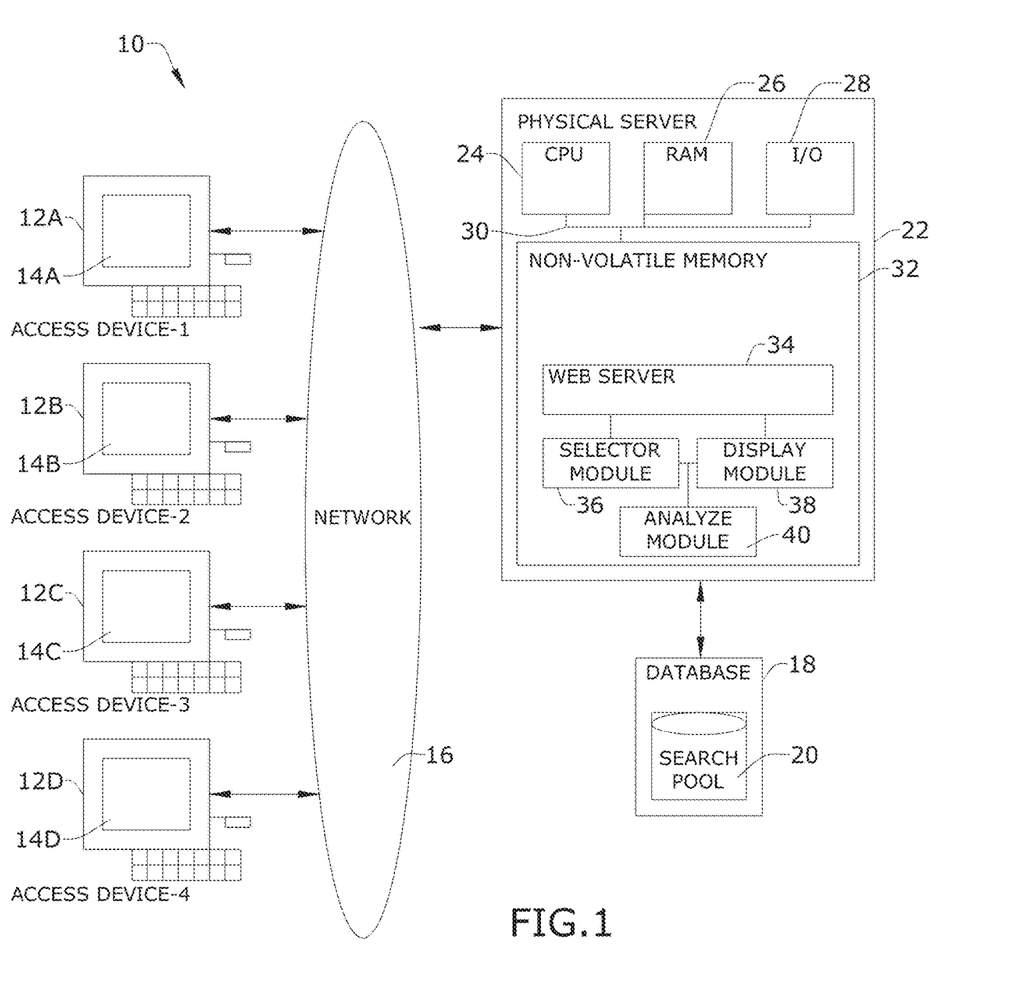
FIG. 1 is a schematic view of an embodiment of the present invention.
Figure 2:
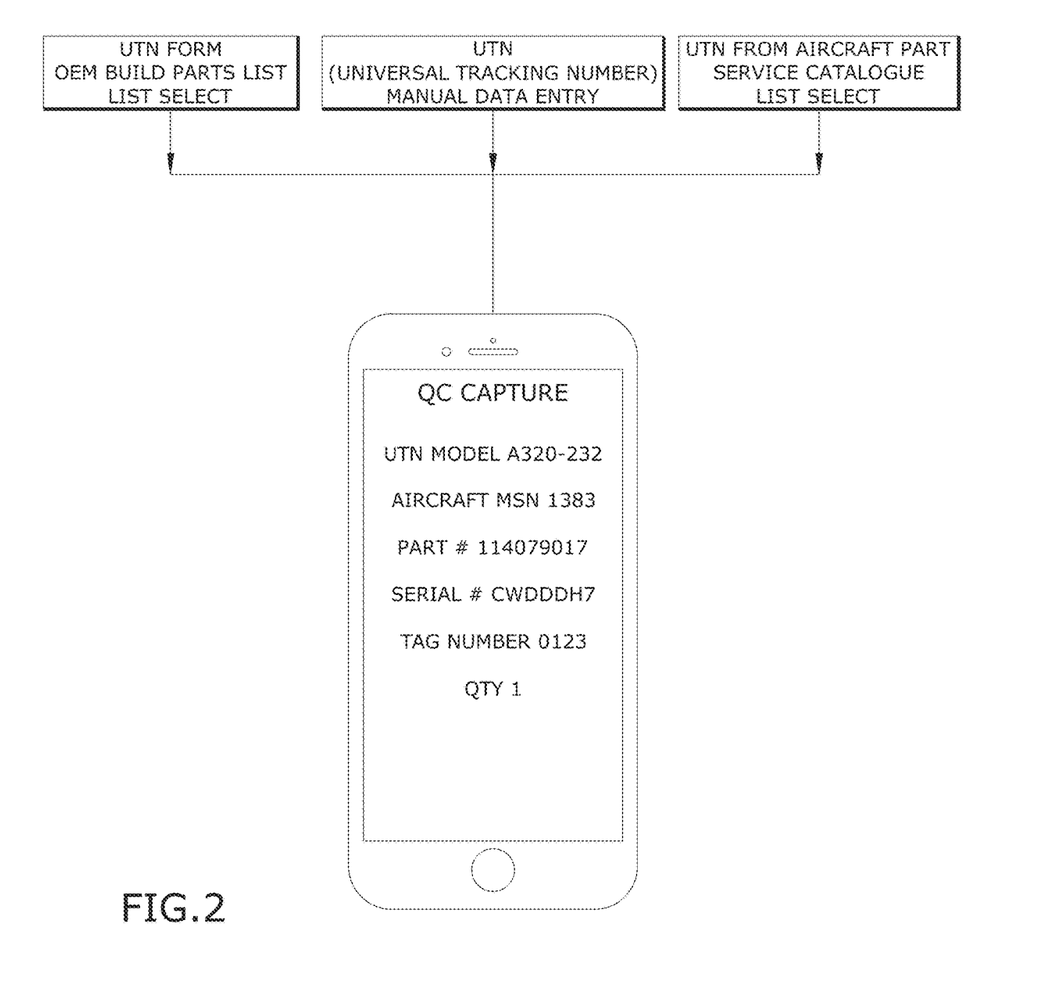
FIG. 2 is a schematic view of an embodiment of the present invention.
Figure 3:
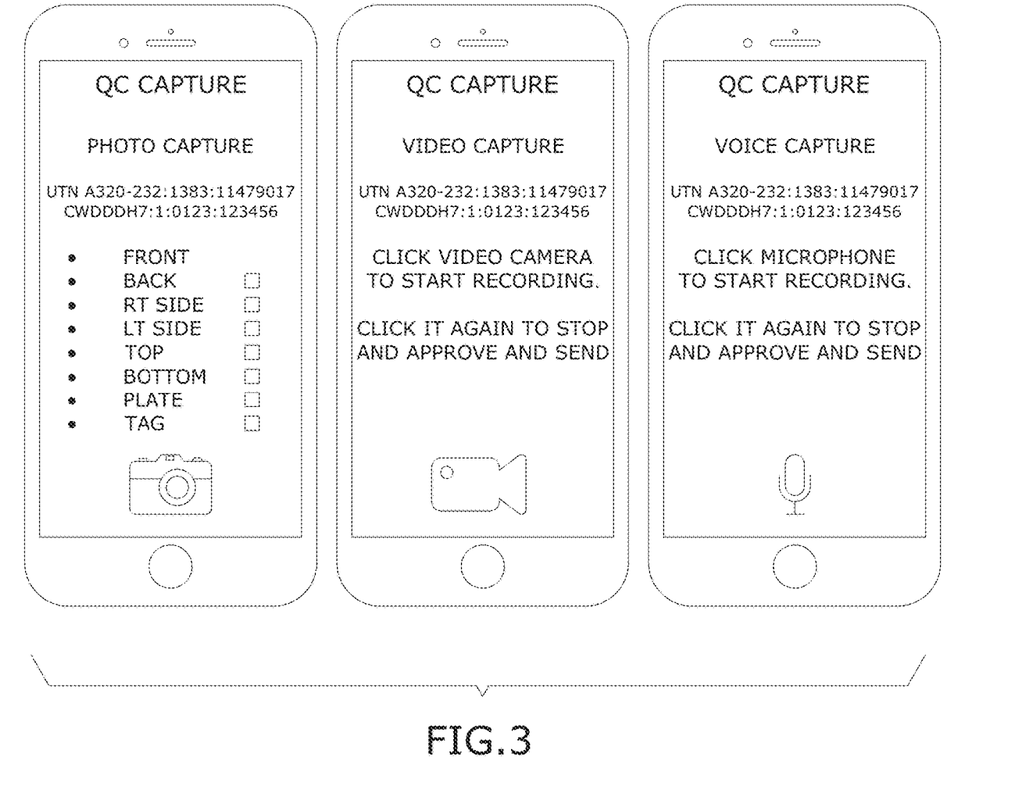
FIG. 3 is a schematic view of an embodiment of the present invention.
Figure 4:
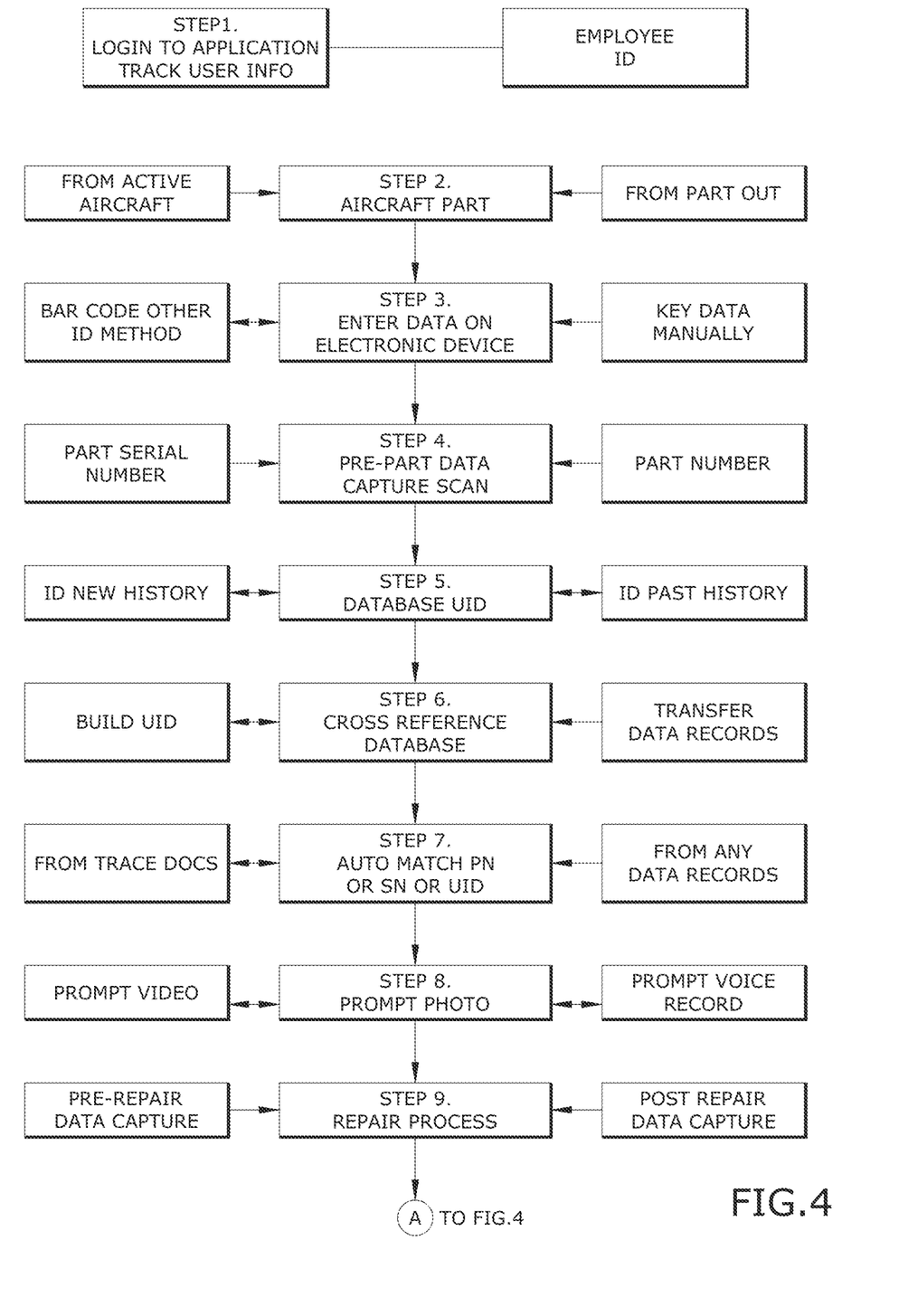
FIG. 4 is a flow chart of an embodiment of the present invention.
Figure 5:
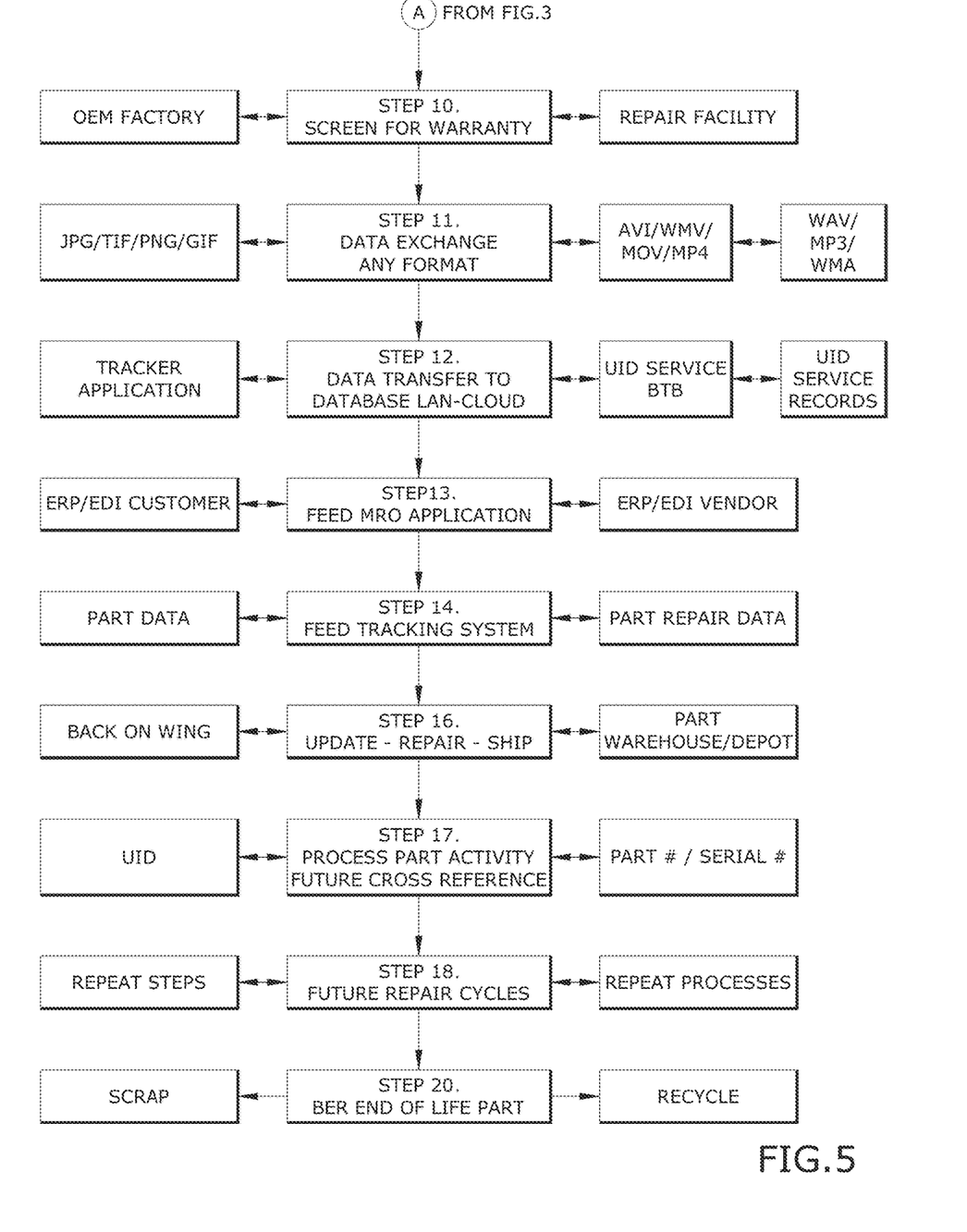
FIG. 5 is a continuation of the flow chart of FIG. 4.

Referring to FIG. 1, the system 10 includes a server 22 that searches for, generates, and updates aircraft part files in response to requests from access devices 12A-D. The access devices 12A-D may be a computing device, such as but not limited to, a smart phone, a tablet, a PDA, a desktop, a laptop, and the like. As shown in FIG. 1, a user using an access device 12A-D over a network 16 can access the server 22 to search for, generate, and update aircraft part files via a web browser or an application 14A-D loaded on a memory of the access device 12A-D. Although only four access devices are illustrated in FIG. 1, the system 10 can be configured to support various numbers of access devices.

Network 16 can include various devices such as servers, routers, and switching elements that can be connected in an extranet, intranet or Internet configuration. In some implementations, the network 16 uses wired communications to transfer information to and from the access devices 12A-D and the server 22. In other implementations, the network 16 uses wireless communication protocols. In yet other implementations, the network 16 uses a combination of wired and wireless communication protocols Database 18 stores the aircraft part files in the form of data packages accessible to the server 22. In one preferred embodiment, the database 18 is a relational database that maintains the aircraft part files in a search pool 20. In another preferred embodiment, the database 18 is a directory server, such as a Lightweight Directory Access Protocol ('LDAP') server, that maintains the aircraft part files in the search pool 20. In other implementations, the database 18 and search pool 20 are a configured area in the non-volatile memory 32 of the server 22 that maintains the aircraft part files information.

As shown in FIG. 1, the server 22 includes a central processing unit ('CPU') 24, random access memory ('RAM') 26, non-volatile memory 32 and an input-output device 28, all of which are interconnected via a bus line 30 and controlled by the CPU 24. The non-volatile memory 32 is configured to include a web server 34 to communicate with access devices 12A-D, a selector module 36 to determine search features associated with aircraft parts in the search pool 20, an analyze module 40 to identify aircraft part files from the search pool 20 and a display module 38 to display pictures, videos, and text data within a selected aircraft part file.

Web server 34 manages communications between the access devices 12A-D and the server 22. Preferably, the web server 34 is configured to send and receive information in the form of web pages to any of the browsers or applications 14A-D in response to a request. The web server 34 communicates with each web browser or application 14A-D and software modules 36, 38 and 40 using one or more communication protocols, such as HTTP (Hyper Text Markup Language). In one preferred embodiment, for example, the web server 34 is configured to include the Apache HTTP Server from the Apache Software Foundation. In another preferred embodiment, the web server 34 includes Internet Information Services (IIS) from Microsoft Corporation. In yet another preferred embodiment, the web server 34 includes the Sun Java System Web Server from Sun Microsystems.

Referring to FIGS. 2 through 5, a user use's one of the access devices to communicate with the server and generate a maintenance report data package for an aircraft part file of an aircraft part. A user may be prompted to create a new maintenance report data package when the aircraft part is removed from an aircraft, before the aircraft part is shipped from an airline to a repair vendor, when the repair vendor receives the aircraft part from the airline, after the aircraft part is repaired, before the aircraft part is shipped back from the repair vendor to the airline, when the airline receives the aircraft part back from repair vendor, and/or before the aircraft part is placed back on the aircraft.

A user may first create a username and password using personal identifying information. The user logs into the web server prior to creating a new maintenance report data package. The personal identifying data is linked to each created maintenance report data package. Therefore, if there are any issues with the aircraft part, a record of which user created what maintenance report data package is kept throughout the lifetime of the aircraft part.

The new maintenance report data package is created when a user is handling an aircraft part from either a part out or from an active aircraft. After the user has logged into the web server, the user may enter identifying information of the aircraft part on the access device, which may be done by scanning barcodes, RFID tags, or keying in the data manually. The identification information may include but is not limited to, a part number, a serial number, a tag number, an airplane manufacturer's serial number, or a combination thereof. In certain embodiments, a universal tracking number for the electronic file of the aircraft part may be generated. The universal tracking number may be a combination of the part number, the serial number, the tag number, and the airplane manufacturer's serial number that the aircraft part was pulled from. The universal tracking number may be used during the lifetime of the aircraft part for searching, tracking, and verifying documentation history.

The database is searched for an electronic file of the aircraft part that matches the entered identifying information. If no electronic file is found, the present invention further includes creating a new electronic file of the aircraft part linked with the universal tracking number. If an electronic file is found, the new generated maintenance report data package may be linked to the electronic file, and an updated version of the electronic file is saved to the database.

The user is then prompted to capture aircraft part data including a single or plurality of pictures of the aircraft part, a video recording of the aircraft part, and a voice recording. Once the aircraft part data is captured, the data files are automatically renamed to include identifying information of what was captured and the universal tracking number or other preferred naming schema. This way the aircraft part data is linked to the maintenance report data package, which is in turn linked to the electronic file for the respective aircraft part.

Technicians can use any of the methods used in the field or previous steps and then take pictures, record videos or record voice messages that is added to that particular maintenance report data package which can be historically traced in the future. The present invention allows for pre-repair capture of the aircraft part and a post repair capture of the aircraft part, which is all added as a separate maintenance report data package to the electronic file.

In certain embodiments, previous warranties as identification of billable and non-billable warranty repair work may be searched for. Warranty information may be entered by the part owner in any database to use this functionality.

All of the captured files are sorted and stored based on their file formats from the capture devices. The present invention may provide for file conversions for standardization, files size limits and file compression to reduce storage costs and file transfer times.

All of the information is placed in the identified files and stored locally or in a cloud-based database for cross referencing and data exchange and history BTB trace. It also can coordinate repair with MRO tracking and other third party application. The electronic files may be fed to EDI (Electronic Data Exchange) applications, which allows the transfer of data to users and third-party ERP systems. The present invention further includes the process to exchange aircraft part data and repair data to track and trace applications. The electronic files are updated after the repairs are completed and the part is shipped to the aircraft part owner location or third party location and the data of the shipment is included in the trace records. The aircraft part may go through transfer and repair several times until the aircraft part has reached the end of its life with cross referenced data. The steps listed above may be repeated for the same aircraft parts. Once the aircraft part is the BER (Beyond Economical Repair) end of life cycle and the aircraft part is destroyed and/or recycled, ending the parts life history and updating the electronic file to recognize the aircraft parts decommission.

This methodology is revolutionary for the aviation industry in terms of processes. Users first log into an application or web browser for the identification and tracking of the aircraft part. Additionally, users add personal identification information for user accountability. The user is responsible for the quality and completeness of the data that is entered. Like any application in the aviation industry which is an FAA and other government and country mandated quality control process, the present invention requires proper identification of the user for photo, video and voice recording as it does for paper-based documents signed by the originator. Once the first step is complete, the next steps in the process are dependent on its previous step and requirements. Each step captures an element of data to accommodate the record of the aircraft part. Some steps require integration to other databases, yet the application provides for manually data entry, so third-party databases are not the only source of information inputted.

Data capture in some of the steps can be automated to use existing data reading applications such as bar code and RFID technology. The data may be captured using off the shelf technology or can be customized to meet the needs and data security and exchange requirements of any organization. The steps in the methodology are easy to understand and use accepted practices of the aviation industry.

One of the main ideas in this methodology and covered by the elements of the present invention is the concept of data or file naming push vs pull in the methodology. With the steps in this new methodology the application steps prompt user identification for the application and the manual entry of data or choosing from a database before a picture video or voice recording is made. The application in the steps create a Universal ID or can use an existing ID. The methodology of the present invention can apply a file naming schema that makes sense to the user, the company, and the industry as a newly created standard. What is also unique in the step-by-step process is the detail to data exchange enhancing the trace standards used today to document part conditions. The present invention provides for tackling the file type and file size variations of photo, video, and voice recording which vary by computer operating systems and photo, video and voice recording computer mobile devices using different manufacturer operation systems. Another function in the step process is tracking and the sharing of data with EDI and ERP systems worldwide. The final steps also provide for a part lifetime data trail with the addition of photo, video, and voice recording now being added to the part trace documentation from birth (first repair) to death (last repair), which can be exchanged worldwide.

The following include a list of benefits provided by an embodiment of the present invention:

- Adds Pull Photo vs Push photos documentation capabilities.
- Adds Pull Video documentation capabilities. Adds Pull Voice recording documentation capabilities.
- Improve Part out and Line Maintenance applications
- Improved QC on all parts owned by the airline, MRO or OEM.
- Improve Safety and Compliance on aircraft parts.
- Improved compliance—new Photo Video and Voice Recording Standard.
- Ability to identify and track shipping damages of parts between the airline and its repair vendors.
- Advanced QC information on condition of part and needed parts for repairs by description and photo/video/voice capture currently not available in the industry.
- Shorten Repair Turn Around Times—See condition of part before it arrives at shop and pre order and schedule repairs.
- Documents the condition of the part into a shop pre repair.
- New standardization of photo/video/voice capture for the life of a part or part exchange (Pixels-file size-compression).
- Faster repair and overhaul turnaround time (technician can describe failure or damage via the application and this information can arrive before the part arrives at the shop speeding up the repair process). Proactive vs Reactive repairs.
- Increased asset value of a well-documented part with photo/video/voice capture files vs a part without the documentation.
- Identify any connectors or accessorizes attached or missing from the part.
- Can integrate into airline, MRO and asset owners existing Identification and tracking system.
- It enables failed or unrepairable parts to be better documented.
- Documents the condition of the part post repair and shipment (can be used in marketing).
- Will be full supported by b2b-aero.com MRO tracker EDI application for data exchange.
- Can be used in block chain documentation support.
- Can be OEM or third party integrated.
- Can be FAA, EASA, CAAC, ARSA, ASA integrated.
- Universal Mobile applications—will run on IPHONES™, IPADS™, ANDROID™, WINDOWS™ or other operating systems or portable devices with camera, video and voice recording capability.

Creates Jpeg, Way, Q file, MOV and other file format standardization.

Enables high resolution image capture and conversion.

Enabled to follow an aircraft part from off wing to back on wing even with exchanges on different airline aircraft. (Global Tracking).

New levels of part Safety.

Improved and traceable part repair compliance.

Use 3D cameras, infrared or any new and improved camera and image/video and sound technology.

Figure 6:
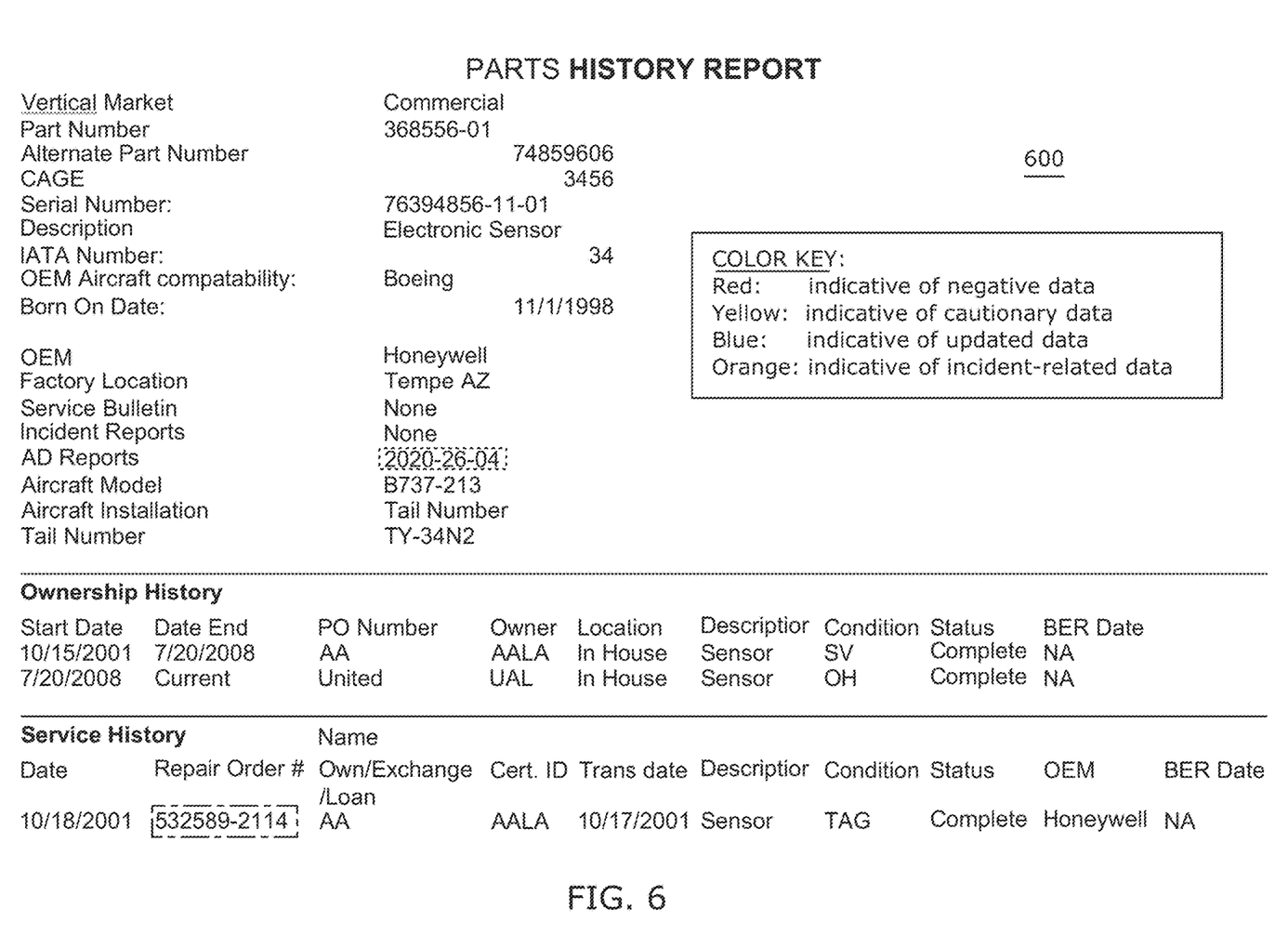

Referring to FIG. 6, the present invention includes production of a searchable parts history report 600 that provides searchable results that lists the part origination (OEM) history, ownership history and service history. Data links can be place in the online-accessible parts history report 600 with links 210 to actual support documents in various formats such as PDF, JPEG, word etc. A systemic authorized user/subscriber to the parts history report 600 and related document service module 130 is enabled to view the underlying documents, including download capabilities of full view or redacted documents, and as a service would be charged a fee and a royalty to the document owner or copyright owner could be paid.

Figure 7:
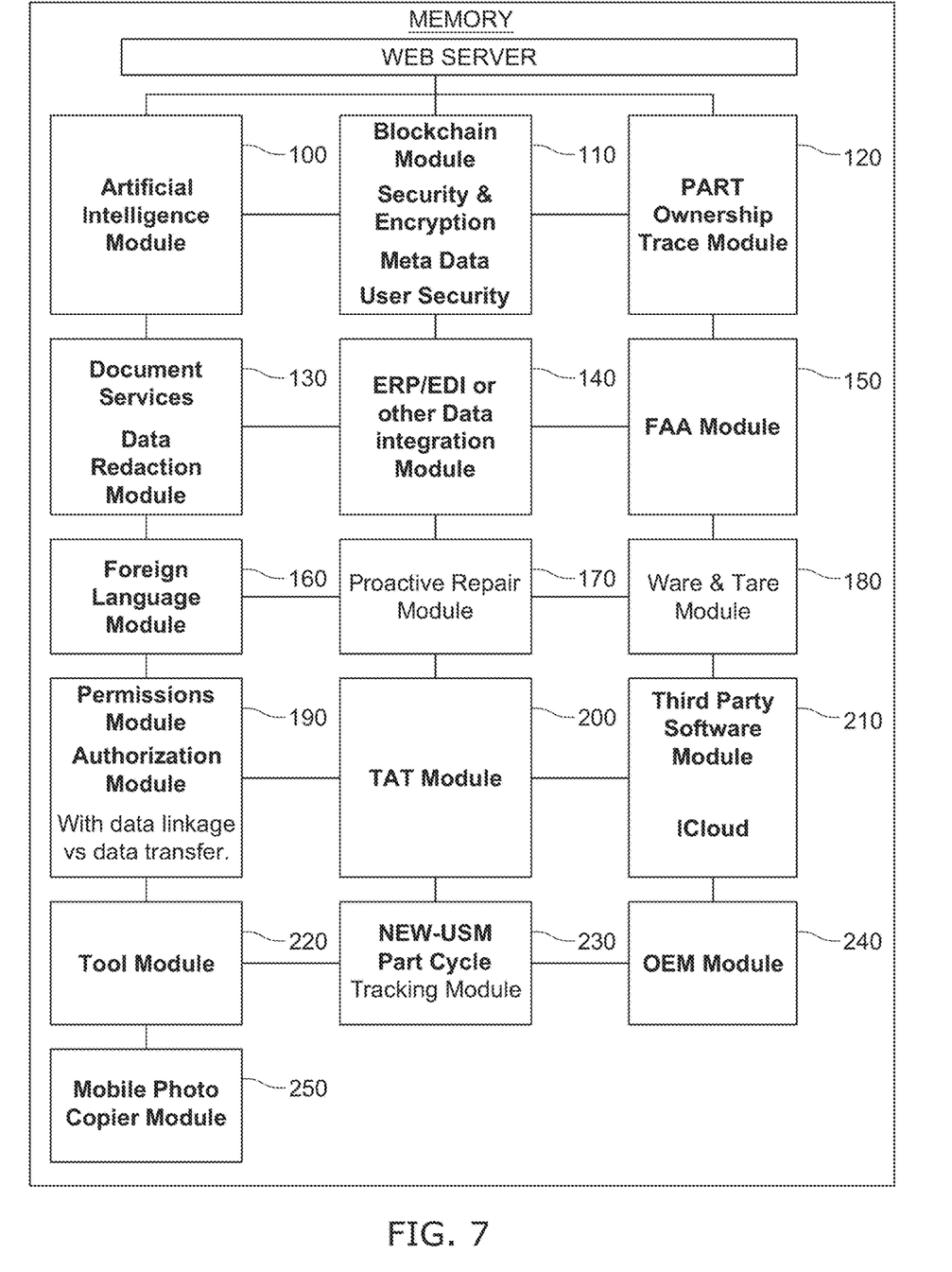
FIG. 7 is a schematic view of an exemplary embodiment of configuration of modules of the present invention, it being understood that the modules shown may be re-configured. Additionally, disclosure herein may express one or more modules not shown in FIG. 7, though not necessarily explicitly stated as a 'module', and these expressed modules may be added to schematic configuration in other embodiments.
Figure 8A:
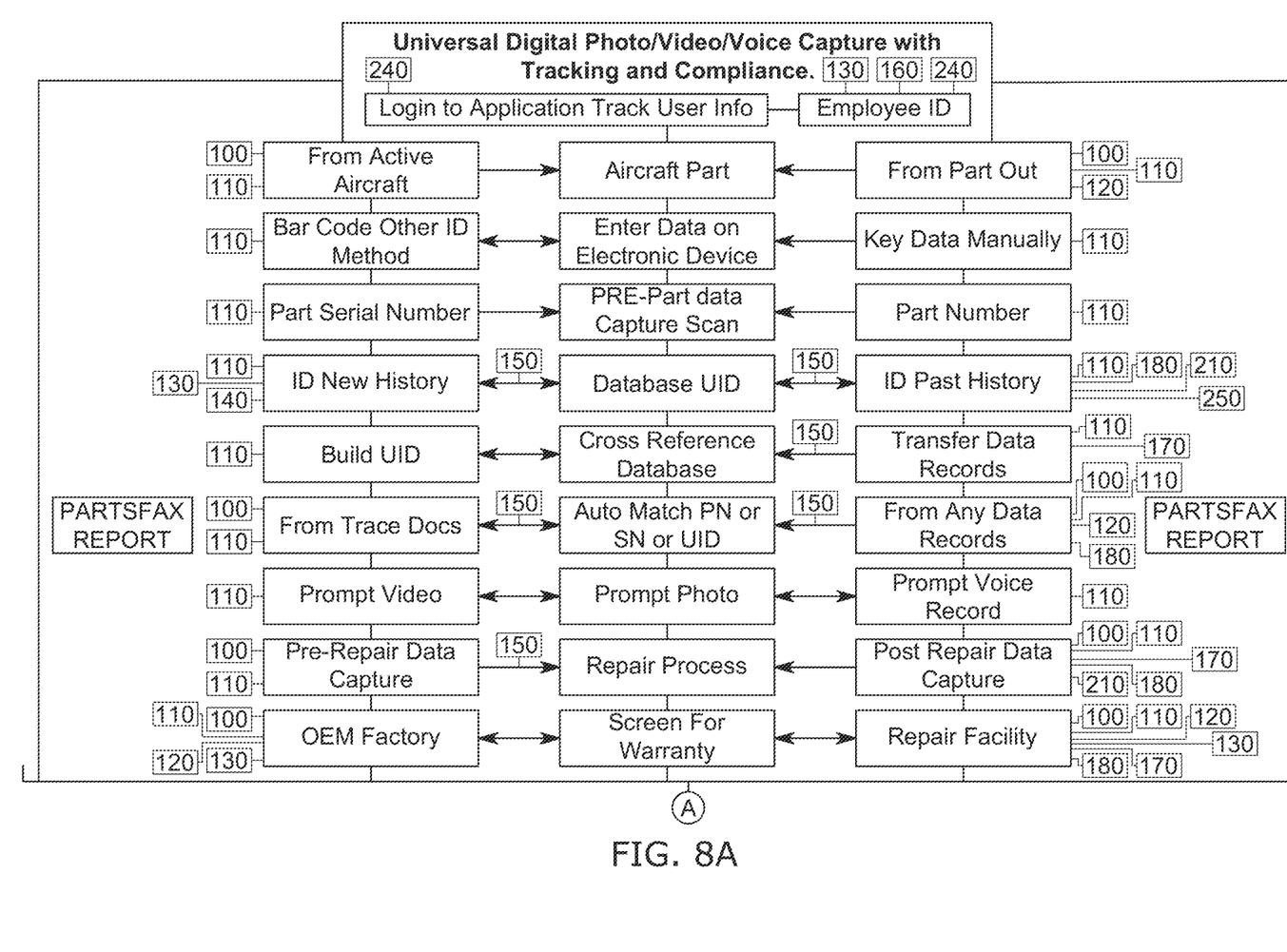
FIG. 8A is a schematic view of an exemplary embodiment of a workflow of the present invention, it being understood that additional expressed modules as described in the description of FIG. 7 may be incorporated within this workflow. Furthermore, it is understood that the workflow may be rearranged and still be within the scope of the present invention.
Figure 8B:
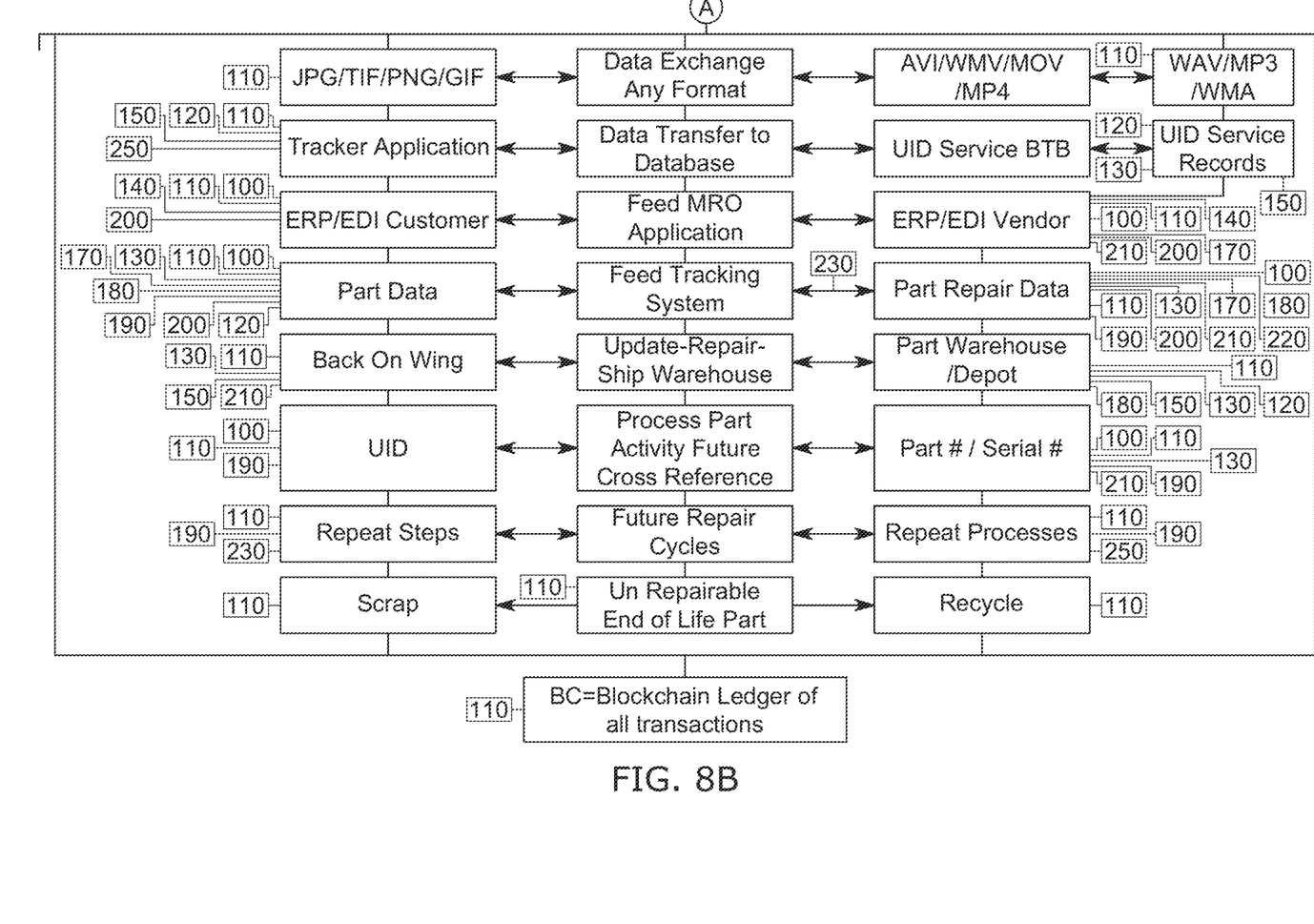
Figure 9:
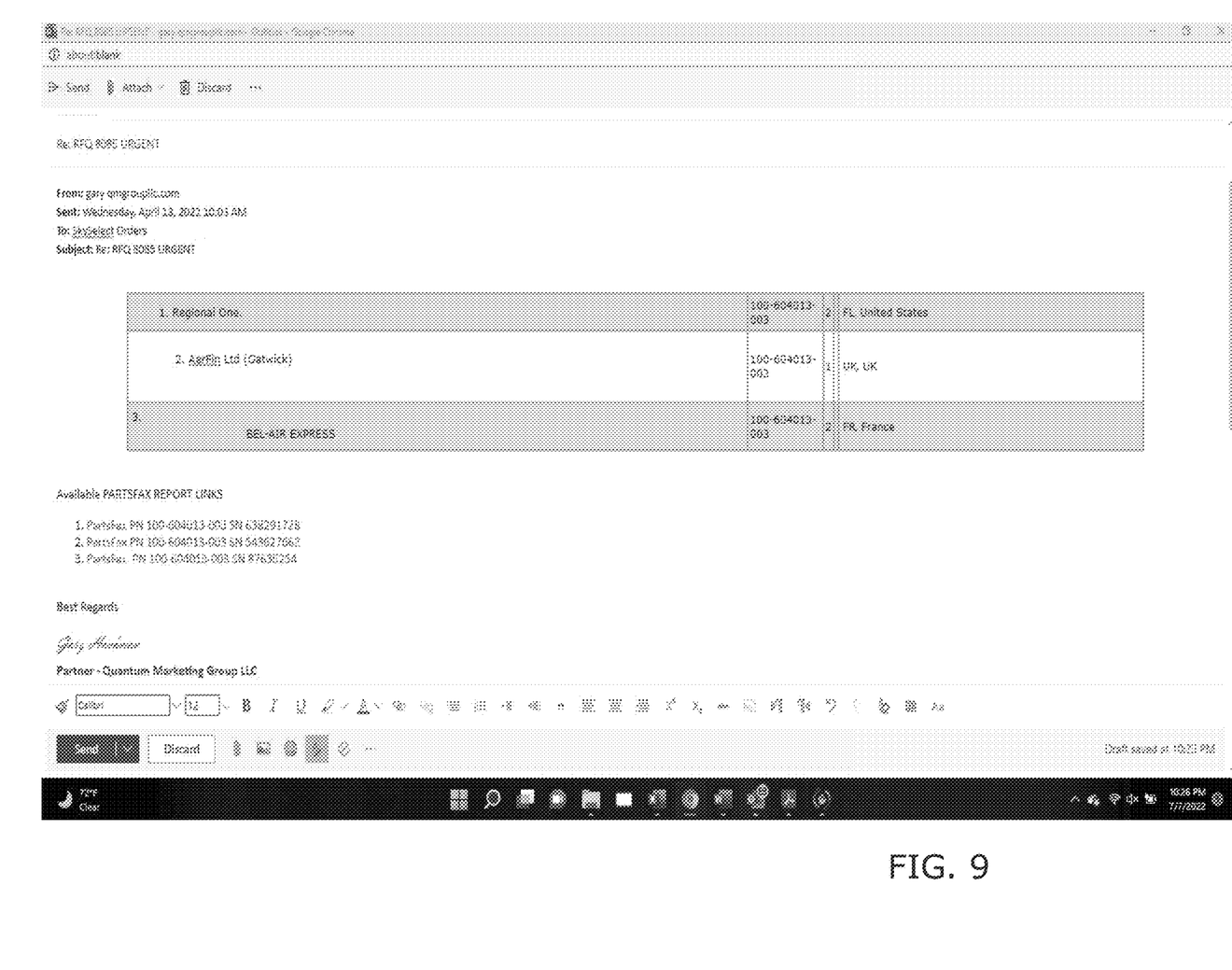
FIG. 9 is a schematic view of an exemplary embodiment of a workflow-based email of the present invention.

Referring to FIGS. 7-8B, the present invention may include Cloud functionality, including but not limited to iCloud and Hybrid Clouds that are open systems based, thereby making the disclosure herein open ended to be compatible with other systems. The Cloud functionality enables module configurations, wherein Enterprise Resource Planning (ERP) and integration of blockchain functionality through systemic interaction is also disclosed. Transaction initiation can take place in the ERP system, wherein part identification and transactional trace information is recorded in the blocks. The data flow via EDI or other secure transfer method takes place on local and remoted data servers performing data transactions.

The present invention may incorporate data integration of third-party and propriety cloud servers, wherein data linkage data extraction, data matching, data filling, data exchange, data viewing, data printing can all be done by an Artificial Intelligence (AI) module 100 learning the different software applications and data formats to create data trace and trailer searchable parts history report 600. The AI reports can be information driven, part number driven, OEM driven, operator driven MRO driven, etc. Technical performance, logistic performance, aircraft part performance, whereby part failure rates, OEM usage rates, number of repairs, average time between repairs, BER reporting etc., are searchable data or documents accessible through different link types found on the searchable parts history report 600.

The present invention can add smart tooling information to part installations and include an integrated part tool library that links to OEM required tool list for repairs on certain parts. The present invention is enabled with the ability to add user photo id and biometric IDs through a photo ID application/module to the login ID systems and trace of transactions of the user doing the transaction based on a login ID.

The present invention may be configured to add encryption and security feature modules, wherein the data encryption and security application modules can be added to the methodology including data redaction as well.

The present invention may be configured to create document services and charge for viewing, printing of documents, wherein data files never leave the servers so that any requested to view is shown with a watermark and a controlled sign print version can be accessed. These services are billable.

The present invention may be configured to have the ability to add AI to the applications via the AI module 100. AI can be added on to the application for part life cycle analysis, part cost analysis, part failure analysis, and overall quality control. Part performance analysis, part transaction analysis, etc. The present invention may be configured to add OCR, QR code, RFID, bar code or any other data identification system solution. The present invention may be configured to add to manual keyed in part ID information, other methods can be used. The AI module 100 provides logistical control and ownership control of data and data from third-party servers, whereby creation of AI searchable reports forms single part numbers to more complex parts like landing gears are enabled.

The blockchain module 100 enables a transactional flow covering the many transactions in performing part condition documentation through parts many lifecycles and exchanges. Each transaction creates an opportunity to record the transactions of the part via a Blockchain containing trace data and linkage to other blocks of the blockchain related to the part via a serial number, a part number, a universal ID number, or other embedded identification and trace methodology, as reflected in FIGS. 8A and 8B. These new blocks of the blockchain are recorded in ledgers following well document structures insuring industry standardization. Data encryption and security application can be added to the methodology including data redaction as well.

The part ownership trace module 120 is configured so that all aircraft parts have a starting point in their life cycle. In certain embodiments, the owner is an OEM. During the lifecycle of parts differs greatly. Certain parts get on board a date and look for linking lineage files.

The document services module 130 may be configured to create document rules and processes for viewing, sharing, and the like for the overall systems.

The ERP/EDI module 140 may be configured for transaction initiation in an accounting or ERP system, wherein part identification and transactional trace information is recorded in the blockchain. The data flow via EDI or other secure transfer method takes place on local and remoted data servers performing data transactions.

The FAA module 150 may be configured to give the FAA the most up to data parts database of FAA approved, including integration of AD and other critical data. FAA administrators will have full unreacted data access and will be able to do remote inspections and audits right from their desktop Enabling them to go much deeper into historical records.

The foreign languages module 160 may be configured translate the application to be compatible with the dialects of a location of use.

The proactive repair module 170 may be configured to monitor the individual parts that go into a unit for determining high failure subparts, as may be procedurally required.

The ware & tare module 180 may be configured for power by the hour and smart contracts, and documents parts conditions during specific periods.

Rather than maintain engines or airframes themselves, many airlines may contract out the service such as with engines. The program is called power by the hour. Here a third-party maintenance company gives a flat rate based on engine usage per hour of flight or runtime. Airlines are charged additional monies for "wear and tear" on parts and have no way to check the condition of those parts today. Under the present invention, users will have a way to document part condition before usage and after usage The permissions and authorization module 190 may be configured so that data files never leave the server network, any requested to view is show with a watermark and a controlled sign print version can be accessed. These services are billable. In some cases, a repair may have been done for the owner of the part at that time and sold to a third party later and a request to see the repair information which belongs to the payer of the repair might need permission or authorization.

The TAT module 200 may be configured so that documents turnaround time on repairs and overhauls performance criteria.

The third part software module 210 may be configured to setup for customer driven application for airframe and engine parts.

The tool module 220 may be configured with the ability to add smart tooling information to part installations and related information with OEM tool recommendations matches tools with application at the line maintenance of heavy maintenance level. The tool module 220 ensures proper installations and deinstallations.

The new to USM part cycle tracking module 230 may be configured as a mobile application enabled to create new data including the born-on date for new parts starting the Blockchain for that particular part or assembly and for USM repair data shows the number and limits of refurbishing parts.

The OEM parts module 240 may be configured for verifying the technical part ID and related identifying information is eligible.

The mobile photo copier module 250 may be configured to enable the photographic identification processes disclosed herein.

It should be understood, of course, that the foregoing relates to exemplary embodiments of the invention and that modifications may be made without departing from the spirit and scope of the invention as set forth in the following claims.

What is claimed is:

1. A method of documenting condition, repair, or overhaul of aircraft parts, the method comprising steps of:
   entering, using a computing system, at least one identification number for an aircraft part, wherein the at least one identification number comprises a part number, a serial number, a tag number, an airplane manufacturer's serial number, or a combination thereof;
   searching, using the computing system, a database for an electronic file of the aircraft part using the at least one identification number;
   creating, using the computing system, the electronic file of the aircraft part if the electronic file is not found on the database, wherein the at least one identification number is linked to the electronic file;
   receiving, by way of the computing system, a universal tracking number for the electronic file of the aircraft part;
   generating, using the computing system, the universal tracking number if the electronic file was not found, and linking the universal tracking number with the at least one identification number;
   generating, using the computing system, a maintenance report data package, wherein the maintenance report data package is linked to the electronic file;
   entering, using the computing system, personal identifying data of a user generating the maintenance report data package, and linking, using the computing system, the personal identifying data to the maintenance report data package;
   entering, using the computing system, status identifying data of the aircraft part, and linking, using the computing system, the status identifying data to the maintenance report data package;
   capturing, using a capture device comprising a camera and a microphone, aircraft part data comprising at least one picture having an image format, a video recording having a video recording format, and a voice recording having a voice recording format, wherein the image format, the video recording format, and the voice recording format are different from one another;
   converting said different formats into a standardized file format;
   creating a filing name for each aircraft part data, wherein the filing name comprises the personal identifying data, the status identifying data, the universal tracking number, and meta data associated with the capture device;
   wherein the status identifying data is selected from the group consisting of a pre-removed status, a pre-shipped to vendor status, a vendor received status, a post repair status, a pre-shipped back status, an airline received status and a pre-placed back status;
   linking, using the computing system, the filing name to the maintenance report data package;
   converting the linked maintenance report data package and said meta data to the standardized file format;
   embodying all data associated with the standardized file format in a clickable link of a searchable document on a user interface provided by the computing system, wherein the searchable document is automatically updated in real-time; and
   saving, using the computing system, an updated version of the electronic file to the database,
   whereby all data captured is placed in a pooled and networked database compiling current data files with historical datafile residing or located in one or more third-party servers.

* * * * *